United States Patent Office 3,547,999
Patented Dec. 15, 1970

---

3,547,999
4 - ALKYL - DIALKOXY - α - METHYL - PHENETH-YLAMINES AND THEIR PHARMACOLOGICAL-LY-ACCEPTABLE SALTS
Alexander T. Shulgin, Lafayette, Calif., assignor to The Dow Chemical Company, Midland, Mich., a corporation of Delaware
No Drawing. Continuation of application Ser. No. 691,709, Dec. 19, 1967, which is a continuation-in-part of application Ser. No. 605,550, Dec. 29, 1966. This application July 14, 1969, Ser. No. 841,561
Int. Cl. C07c 87/28
U.S. Cl. 260—570.8                    5 Claims

ABSTRACT OF THE DISCLOSURE 4-alkyl-di(lower alkoxy) - α - methylphenethylamines wherein alkoxy occupies one pair of the 2,5 and 2,6 positions on the benzene ring and alkyl is from 1 to 6 carbon atoms, inclusive, and the pharmacelogically-acceptable salts of such amines. These compounds affect the nervous system of vertebrates and are particularly adapted to be employed for the study of the depressant and stimulant activity of drugs upon the central nervous system of animals.

---

CROSS-REFERENCE TO RELATED APPLICATION

This application is a continuation of application Ser. No. 691,709, filed Dec. 19, 1967 and now abandoned, which in turn was a continuation-in-part of application Ser. No. 605,550, filed Dec. 29, 1966, now abandoned.

BACKGROUND OF THE INVENTION

The present invention is concerned with novel chemical compounds and methods for their preparation and is particularly directed to a class of 4-alkyl-dialkoxy-α-methylphenethylamines and their pharmacologically-acceptable salts. These compounds have outstanding properties in their effect on the nervous system of vertebrates. Many chemical materials previously have been proposed as valuable as nervous system stimulants or depressants, e.g., methylphenethylamine ($C_6H_5CH_2CH(NH_2)$—$CH_3$) commonly known in the art as amphetamine and referenced in U.S. Pat. Nos. 1,879,003, 1,921,424 and 2,015,408, and in J. Am. Chem. Soc. 53, 1875 (1931). However, such proposed materials usually have been restricted in their scope of utility by one or more shortcomings such as, for example, low activity and the production of undesirable side effects upon the animal organism. However, the present compounds are characterized as without substantial undesirable side effects at effective dosages and as being capable of the induction and maintenance of a state indicative of the feeling of well-being. Further, the compounds are adapted to be employed for the study of the stimulant and depressant activity of chemical materials upon the nervous system of animals, and the qualtitative and quantitative evaluation of such activity.

SUMMARY OF THE INVENTION

The present invention is directed to a group of new 4-alkyl-di(lower alkoxy)-α-methylphenethylamines corresponding to the formula

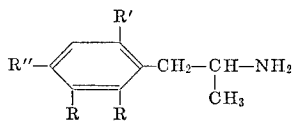

and their pharmacologically-acceptable salts. In this and succeeding formulae, one R represents hydrogen and the other R represents lower alkoxy, R' represents lower alkoxy and R'' represents alkyl containing from 1 to 6 carbon atoms, inclusive. In the present specification and claims, lower alkoxy represents an alkoxy moiety containing 1, 2, 3 or 4, or from 1, to 2, to 3, to 4 carbon atoms, inclusive. Representative alkoxy and alkyl moieties include methoxy, ethoxy, propoxy, isopropoxy, butoxy, methyl, ethyl, propyl, isopropyl, butyl, sec.-butyl, tert.-butyl, amyl, sec.-amyl, isoamyl and hexyl. The new compounds of the present invention, herein referred to simply as "phenethylamines," are crystalline solids or oily liquid materials. The free phenethylamines are of very low solubility in water and are soluble in common organic solvents such as acetone, benzene, methanol, ethanol and isopropanol. The pharmacologically-acceptable salts are of varying degrees of solubility in water and common organic solvents. The new compounds of the present invention affect the nervous system of vertebrates and are particularly adapted to be employed for the study of the depressant and stimulant activity of drugs upon the central nervous system of animals.

The primary attribute of the pharmacologically-acceptable salt is that it comprises a pharmacologically-acceptable anion which is nontoxic at the desired dosage. The choice of anion is not critical, although a given salt may, in some instances, exhibit special advantages due to solubility, ease of crystallization, lack of objectionable taste and the like. Representative pharmacologically-acceptable anions include the following: chloride, bromide, iodide, sulfate, bisulfate, acetate, salicylate, valerate, oleate, laurate, borate, benzoate, lactate, diglycollate, phosphate, phenylethylbarbiturate, o-acetoxybenzoate, citrate, theophyllinate, urate, maleate, fumarate, succinate, tartrate, penicillinate, camphorate, salicylamide, carbonate, cacodylate, aconitate, sulfamate, gentisate, malate, cinnamate, stearate and the like.

Representative phenethylamines of the present invention include 2,6-dimethoxy-α,4-dimethylphenethylamine,
2,5-diethoxy-α,4-dimethylphenethylamine,
2,6-diethoxy-α,4-dimethylphenethylamine,
2,5-dibutoxy-α,4-dimethylphenethylamine,
2,6-dipropoxy-α,4-dimethylphenethylamine,
4-ethyl-2,5-dimethoxy-α-methylphenethylamine,
4-ethyl-2,6-dimethoxy-α-methylphenethylamine,
4-ethyl-2,5-diethoxy-α-methylphenethylamine,
4-ethyl-2,6-diethoxy-α-methylphenethylamine,
2-methoxy-6-ethoxy-α,4-dimethylphenethylamine,
2-methoxy-5-ethoxy-α,4-dimethylphenethylamine,
2-ethoxy-5-methoxy-α,4-dimethylphenethylamine,
4-ethyl-2-methoxy-6-ethoxy-α-methylphenethylamine,
4-ethyl-2-methoxy-5-ethoxy-α-methylphenethylamine,
4-ethyl-2-ethoxy-5-methoxy-α-methylphenethylamine,
4-butyl-2,5-dimethoxy-α-methylphenethylamine,
4-hexyl-2,6-diethoxy-α-methylphenethylamine,
4-propyl-2,6-dibutoxy-α-methylphenethylamine,
4-pentyl-2,5-dipropoxy-α-methylphenethylamine,
2-butoxy-5-methoxy-α,4-dimethylphenethylamine,
4-butyl-2,6-dibutoxy-α-methylphenethylamine,
4-hexyl-2,5-dimethoxy-α-methylphenethylamine,
4-propyl-2,5-dimethoxy-α-methylphenethylamine and the salts of each of said free phenethylamines as formed and identified with each of the anions as set forth in the preceding paragraph. Preferred compounds of the present invention comprise the free phenethylamines characterized by the foregoing formula wherein one R represents hydrogen and the other R represents methoxy or ethoxy and R' represents methoxy or ethoxy and the pharmacologically-acceptable salts of such free amines. A further preferred group comprises the free phenethylamines wherein R as lower alkyl occupies the five position on the benzene ring and the pharmacologically-acceptable salts of such free amines.

The new free phenethylamines are prepared by reducing, for example, with lithium aluminum hydride (LiAlH$_4$)

a 1-(di(lower alkoxy)-4-alkylphenyl)-2-nitropropene corresponding to the following formula:

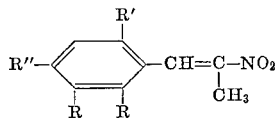

The reaction conveniently is carried out in the presence of an inert reaction medium, preferably an organic liquid such as diethyl ether, tetrahydrofuran, diethylene glycol or dimethyl ether. The reduction reaction proceeds at temperatures between 0° and the boiling temperature of the reaction mixture. In a preferred procedure, the reaction is conducted in an organic liquid and at the boiling temperature of the reaction mixture and under reflux. The amounts of the reactants to be employed are not critical, some of the desired product being obtained when employing the reactants in any proportions. However, the reaction consumes about 2 moles of LiAlH$_4$ with each mole of the nitropropene, and the use of amounts which represent such proportions or an excess of LiAlH$_4$ are preferred.

In carrying out the reaction, the reactants are contacted in any convenient fashion and maintained for a period of time in the reaction temperature range to complete the reaction. In a convenient procedure, the 1-(di(lower alkoxy) - 4 - alkylphenyl) - 2-nitropropene starting material (herein referred to simply as the nitropropene) is added slowly portionwise to a suspension of LiAlH$_4$ in the reaction medium. During the addition of the nitropropene and for a period thereafter, the temperature of the reaction mixture is maintained within the reaction temperature range. In those cases wherein the nitropropene is relatively insoluble in the reaction medium employed (such as in the case of diethyl ether), the Soxhlet extraction technique (see Nystrom & Brown, JACS 69:1197, 1198 (1949)) is conveniently employed for accomplishing the incremental solution and addition of the nitropropene.

Upon completion of the reaction, the desired free amine product is separated by conventional procedures. In a convenient operation, the reaction mixture is cooled and thereafter treated and acidified with a mineral acid to convert the free phenethylamine product to the corresponding salt and to hydrolyze any excess LiAlH$_4$. When a water-immiscible liquid is employed as reaction medium, the reactiion mixture divides into a solvent layer and an acidic aqueous layer during the addition of the mineral acid and hydrolysis of the LiAlH$_4$. Thereafter, the solvent layer is separated and discarded. The remaining acidic aqueous layer containing the salt of the free amine is then treated with potassium sodium tartrate to prevent precipitation of aluminum byproducts and made basic with alkali metal hydroxide to convert from the salt to the free phenethylamine product. The basic aqueous layer is then agitated with an organic solvent such as methylene chloride, chloroform or benzene to extract the free phenethylamine product. The resulting solution of the free phenethylamine product in the organic solvent is separated from the aqueous layer and then distilled to remove the low boiling constituents and obtain the desired free amine product as an oily or solid residue. When a water-miscible liquid is employed as reaction medium, separation into layers does not occur on acidification with the mineral acid. In such operations, after the addition of the mineral acid and conversion of the free amine to the salt form, additional water can be added to the acidic reaction mixture in order to facilitate the extraction of neutral impurities. Following this dilution procedure, the reaction mixture is extracted with a water-immiscible solvent such as ether and the extract discarded. The remaining aqueous portion is then treated with potassium sodium tartrate and thereafter made basic with alkali metal hydroxide. The basic aqueous portion is then processed as previously described to obtain the phenethylamine free base product as an oily or solid residue.

The pharmacologically-acceptable salts of the present invention are prepared by dissolving the free phenethylamine product in ether. To this ether solution is then added a stoichiometric amount of the acid corresponding to the desired salt. The addition and contacting of the reagents are carried out with stirring and warming. The reaction mixture is then cooled to precipitate the desired salt product which may be further purified by the use of standard techniques such as washing with an organic solvent or recrystallization.

The formation of salts of the phenethylamine products provides a method for further purifying said products. Thus, when a more pure free phenethylamine product is desired, the oily residue of the free base product is converted to the phenethylamine hydrochloride salt and the latter recrystallized. Subsequently, the latter salt is dissolved in water, the aqueous solution is made basic by the addition of an alkali metal hydroxide and the resulting basic aqueous solution extracted with a solvent such as methylene chloride. The solvent layer is then evaporated to dryness with exclusion of carbon dioxide to obtain the free phenethylamine product as an oil or crystalline solid. The carbon dioxide-free environment can be obtained by the use of nitrogen, helium, argon or other inert gas which is free of carbon dioxide.

DESCRIPTION OF THE PREFERRED
EMBODIMENTS

The following examples are merely illustrative and are not deemed to be limiting.

Example 1

Employing the Soxhlet technique, 23.7 grams of 1-(2, 5 - dimethoxy - 4 - methylphenyl) - 2 - nitropropene were leached into a stirred mixture of LiAlH$_4$ (20 grams) in 1.5 liters of refluxing ether. The 33 x 80 millimeter thimbles employed to hold the 1-(2,5-dimethoxy-4-methylphenyl)-2-nitropropene material during the Soxhlet extraction procedure had to be filled three times in order to process the entire 23.7 grams. Upon completing the addition (by Soxhlet extraction) of the nitropropene to the ether mixture, the stirring and refluxing were continued for an additional 12 hours. Following the reflux period, the reaction mixture was cooled and one liter of 1.5 N sulfuric acid added portionwise to convert the 2,5-dimethoxy-α,4-dimethylphenethylamine reaction product to the bisulfate salt. During the addition of the sulfuric acid, the reaction mixture divided into an aqueous layer and an ether layer. The two-phase mixture was further diluted with water and the ether layer separated and discarded. The remaining acidic aqueous layer was extracted with an additional 200 milliliters of ether and the ether discarded. The extracted aqueous acidic layer containing the salt of the phenethylamine was then treated with 450 grams of potassium sodium tartrate and made strongly basic with sodium hydroxide to convert said salt to the free phenethylamine. The basic aqueous mixture was thereafter extracted three times with 150 milliliter portions of methylene chloride. The methylene chloride extracts were combined and heated on the steam bath to obtain an oily residue. This residue consisting of the 2,5-dimethoxy-α,4-dimethylphenethylamine product was dissolved in ether and the ether solution saturated with anhydrous hydrogen chloride. During the addition of the hydrogen chloride, the 2,5-dimethoxy-α,4-dimethylphenethylamine hydrochloride product precipitated in the reaction mixture as a crystalline solid and was removed therefrom by filtration and was washed thoroughly with dry ether. The washed and dried product was found to melt at about 186° C. This 2,5-dimethoxy-α,4-dimethylphenethylamine hydrochloride product was then recrystallized from a mixture of isopropanol and ether and the recrystallized product found to melt at 189°–189.5° C.

Example 2

A solution of 1-(4-ethyl-2,5-dimethoxyphenyl)-2-nitropropene (50 grams) in 500 milliliters of ether was added slowly dropwise by means of a conventional dropping funnel to a well stirred, gently-refluxing suspension of LiAlH$_4$ (20 grams) in 1.5 liters of ether. After the addition of the nitropropene was completed (3 hours), refluxing was continued overnight. Upon the completion of the refluxing period, the reaction mixture was cooled in an ice bath and diluted sulfuric acid (220 grams of concentrated sulfuric acid diluted to 1 liter with water) was added slowly portionwise. During the addition of the dilute sulfuric acid, the reaction mixture divided into an ether layer and an aqueous layer. The two-phase reaction mixture which formed during the addition of the dilute sulfuric acid was further diluted with water and the ether layer removed and discarded. The aqueous layer was then extracted with an additional 200 milliliters of ether. The extracted aqueous layer was then admixed with 450 grams of potassium sodium tartrate, made strongly basic by the addition of sodium hydroxide and thereafter extracted with three 150-milliliter portions of methylene chloride. The methylene chloride extracts were combined and evaporated on the steam bath to obtain the 4-ethyl-2,5-dimethoxy-α-methylphenethylamine product as an oily residue. This oily residue was dissolved in 2 liters of ether and the ether solution saturated with anhydrous HCl. During the addition of the hydrogen chloride, the solid 4-ethyl-2,5-dimethoxy-α-methylphenethylamine hydrochloride product (45 grams) precipitated in the reaction mixture and was removed by filtration. The resulting product was combined with a further 274 grams of 4-ethyl-2,5-dimethoxy-α-methylphenethylamine hydrochloride product produced in exactly the same fashion. The combined product was dissolved in one liter of acetic acid at about 90° C. To this solution was added 6 kilograms of ethyl acetate which had been preheated to its boiling point. Several minutes after all of the ethyl acetate was added, crystallization began and was allowed to continue overnight whereupon the 4-ethyl-2,5-dimethoxy-α-methylphenethylamine hydrochloride product was separated by filtration and the filtered product washed with 15 percent acetic acid in ethyl acetate and thereafter dried to constant weight to give the 4-ethyl-2,5-dimethoxy-α-methylphenethylamine hydrochloride product melting at 195° C.

The following compounds of the present invention are prepared from the indicated starting materials in accordance with the methods herein described.

4-tert.-butyl-2,5-dimethoxy-α-methylphenethylamine hydrochloride (melting point 168° C. and identity confirmed by infrared spectrum) by reducing 1-(2,5-dimethoxy-4-tert.-butylphenyl)-2-nitropropene with LiAlH$_4$ and reacting the product thus obtained with anhydrous HCl gas.

4-ethyl-2,5-dimethoxy-α-methylphenethylamine (melting at 61°–61.5° C.) by dissolving 4-ethyl-2,5-dimethoxy-α-methylphenethylamine hydrochloride in water, making the aqueous mixture basic with sodium hydroxide, extracting the basic mixture with methylene chloride and evaporating the methylene chloride in a carbon dioxide-free atmosphere.

2,5-dimethoxy-α,4-dimethylphenethylamine (melting at 60.5°–61° C.) from 2,5-dimethoxy-α,4-dimethylphenethylamine hydrochloride as set forth in the preceding paragraph.

4-tert.-butyl-2,5-dimethoxy-α-methylphenethylamine (molecular weight 254.4) by treating 4-tert.-butyl-2,5-dimethoxy-α-methylphenethylamine hydrochloride with alkali as set forth above.

2,5-diethoxy-α,4-dimethylphenethylamine hydrochloride (melting at 161°–162° C.) by reducing 1-(2,5-diethoxy-4-methylphenyl)-2-nitropropene with LiAlH$_4$ to produce 2,5-diethoxy-α,4-dimethylphenethylamine (molecular weight 237) which is thereafter converted to the hydrochloride salt by treatment with hydrogen chloride.

4-hexyl-2,5-dimethoxy-α-methylphenethylamine (molecular weight 279.4) by reducing 1-(2,5-dimethoxy-4-hexylphenyl)-2-nitropropene with LiAlH$_4$.

2-ethoxy-5-methoxy-α,4-dimethylphenethylamine hydrochloride (melting at 186°–187.5° C.) by reducing 1-(2-ethoxy-6-methoxy-4-methylphenyl)-2-nitropropene with LiAlH$_4$ to produce 2-ethoxy-5-methoxy-α,4-dimethylphenethylamine (molecular weight 223) which is thereafter converted to the hydrochloride salt by treatment with hydrogen chloride.

2,6-dimethoxy-α,4-dimethylphenethylamine hydrochloride (melting at 193°–195° C.) by reducing 1-(2,6-dimethoxy-4-methylphenyl)-2-nitropropene with LiAlH$_4$ to produce 2,6-dimethoxy-α,4-dimethylphenethylamine (molecular weight 209) which is thereafter converted to the hydrogen chloride salt by treatment with hydrogen chloride.

4-ethyl-2,5-dimethoxy-α-methylphenethylamine acid sulfate (molecular weight 321) by reacting 4-ethyl-2,5-dimethoxy-α-methylphenethylamine with sulfuric acid.

2-ethoxy-5-methoxy-α,4 - dimethylphenethylamine (molecular weight 223) by reducing 1-(2-ethoxy-5-methoxy-4-methylphenyl)-2-nitropropene with LiAlH$_4$. Reaction of this amine with citric acid gives the citrate salt.

4-propyl-2,5-dimethoxy-α-methylphenethylamine hydrochloride (melting at 182.5°–183° C. and structure confirmed by infrared spectrum) by reducing 1-(2,5-dimethoxy-4-propylphenyl)-2-nitropropene with LiAlH$_4$ and reacting the product thus obtained with anhydrous HCl.

4-hexyl-2,5-dibutoxy-α-methylphenethylamine (molecular weight 363) by reducing 1-(2,5-dibutoxy-4-hexylphenyl)-2-nitropropene with LiAlH$_4$. Reaction of this amine with acetic acid gives the acetate salt.

4-butyl-2,6-dibutoxy-α-methylphenethylamine (molecular weight 335) by reducing 1-(2,5-dibutoxy-4-butylphenyl)-2-nitropropene with LiAlH$_4$.

2,5 - dimethoxy - α,4 - dimethylphenethylamine acetate (molecular weight of 269) by reacting 2,5-dimethoxy-α,4-dimethylphenethylamine with acetic acid.

2,6-diethoxy - α,4 - dimethylphenethylamine (molecular weight 237) by reducing 1-(2,6-diethoxy-4-methylphenyl)-2-nitropropene with LiAlH$_4$. Reaction of this amine with salicylic acid gives the salicylate salt.

The new free phenethylamines and their pharmaceutically-acceptable, non-toxic salts are useful in studying the stimulant and depressant activity of chemical materials upon the nervous system of vertebrates. In such use, the compounds can be administered to animals orally or parenterally, either unmodified or together with an inert carrier material. Thus, the compounds may be mixed with the daily ration of the animal or incorporated in a finely divided solid, a surface active agent or a combination of a finely divided solid and a surface active agent, and the resulting compositions administered to the animal in the form of powders or liquid dispersions or emulsions. Good results are obtained when the compounds are administered at dosages of from about 0.001 to 0.5 milligram or more per kilogram of body weight, depending upon the particular effect desired, the depth of the effect, the mode of administration, as well as the particular phenethylamine product employed.

In representative operations, 2,5-dimethoxy-α,4-dimethylphenethylamine, 4-ethyl - 2,5 - dimethoxy-α-methylphenethylamine and 2,5-diethoxy-α,4-dimethylphenethylamine, and the hydrochloride salts of such amines give a high degree of stimulation of the central nervous system of rabbits when administered intravenously at dosages of 0.05 milligram per kilogram of body weight. In further operations, 2,5-dimethoxy-α,4-dimethylphenethylamine hydrochloride, when administered intravenously to rabbits at a dosage of 0.03 milligram per kilogram of body weight, effects a 50 percent reversal of the depression produced in the rabbit by the intravenous administration of a dosage of 3 milligrams per kilogram of body weight of phenobarbital. In further operations, the administration of 2,5-dimethoxy-α,4-dimethylphenethylamine hydrochloride in amounts of 0.02 milligram per kilogram of body weight in mice, guinea pigs and dogs produces moderate enhanced activity upon the part of the animals.

The 1-(di(lower alkoxy)-4-alkylphenyl) - 2 - nitropropenes employed as starting materials as herein described are prepared by reacting a 4-alkyl(di-lower alkoxy)benzaldehyde characterized by the following formula

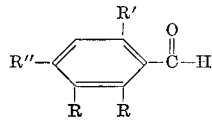

with nitroethane in the presence of an amine as catalyst. The reaction conveniently is carried out in a lower alkanol or acetic acid as reaction medium. When operating with a lower alkanol, the reaction takes place readily at temperatures from 0° to 50° C. and when operating with acetic acid, at temperatures of from about 20° to 120° C. Representative amine catalysts include dimethylamine, diethylamine, pyridine, methylethylamine and piperidine. Good results are obtained when employing the benzaldehyde and nitroethane reagents in substantially equimolecular proportions, and the catalyst in amounts ranging from catalytic to an amount equimolecular with respect to the nitroethane. Upon completion of the reaction, the reaction mixture is diluted with water to precipitate the desired solid nitropropene product which is separated by filtration. This produce may be further purified by conventional procedures. Representative propenes include 1-(2,5-dimethoxy-4-ethylphenyl)-2-nitropropene,
1-(2-methoxy-5-ethoxy-4-methylphenyl)-2-nitropropene,
1-(2-methoxy-6-ethoxy-4-methylphenyl)-2-nitropropene,
1-(2,5-diethoxy-4-ethylphenyl)-2-nitropropene,
1-(2,6-diethoxy-4-ethylphenyl)-2-nitropropene,
1-(2,6-dimethoxy-4-ethylphenyl)-2-nitropropene,
1-(2,5-dibutoxy-4-methylphenyl)-2-nitropropene,
1-(2,6-dipropoxy-4-ethylphenyl)-2-nitropropene,
1-(2,6-diethoxy-4-propylphenyl)-2-nitropropene,
1-(2,5-diethoxy-4-butylphenyl)-2-nitropropene,
1-(2-butoxy-5-methoxy-4-methylphenyl)-2-nitropropene and
1-(5-butoxy-2-methoxy-4-methylphenyl)-2-nitropropene.

The di(lower alkoxy)-4-alkylbenzaldehydes employed as starting materials as above described are prepared in known procedures from alkyl-di(lower alkoxy)benzenes (I), or alkyl-dihydroxyphenols (II), or p-dialkoxybenzene (III) corresponding to the following formulas:

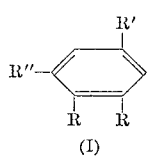 , 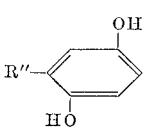 or 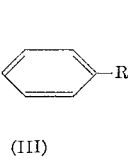
(I)                  (II)                 (III)

In a representative procedure, an alkyl-di(lower alkoxy)benzene (I) is reacted with N-methylformanilide or dimethylformamide and POCl₃. The reaction takes place readily at temperatures of from 20° to 100° C. with the production of the desired 4-alkyl-dialkoxybenzaldehyde. The proportions of the reactants to be employed are not critical; however, in a preferred procedure, the N-methylformanilide or dimethylformamide and POCl₃ are employed in molar amounts in excess of the molar amount of 1-alkyl-di(lower alkoxy)benzene. Following the contacting of the reactants, the reaction mixture is maintained at a temperature within the reaction temperature range for several hours. Following the heating period, the reaction mixture is diluted with water and the aqueous mixture allowed to stand. During this period, the desired product will separate in the aqueous mixture as an insoluble organic oil or solid. This organic layer is then separated by filtration, decantation, centrifugation or extraction with an organic solvent and further purified by such conventional procedures as recrystallization, washing or distillation to obtain the 4-alkyl-di(lower alkoxy)benzaldehyde starting material. In a preferred method, the benzaldehyde starting material is finally purified by chromatography, if desired.

In a method of producing a 4-alkyl-2,5-di(lower alkoxy)benzaldehyde starting material wherein R contains from 2 to 6 carbon atoms, p-dialkoxybenzene (III) is dispersed in an organic liquid such as methylene chloride or carbon disulfide. To this dispersion is added an acylating agent. In a convenient procedure, the acylating agent is comprised of an acyl chloride (R'''Cl) and aluminum chloride. Representative acyl chlorides include acetyl chloride, propionyl chloride, butyryl chloride, valeroyl chloride and hexanoyl chloride. The acyl chloride and aluminum chloride are admixed in an organic liquid and the resulting mixture added slowly dropwise to a solution containing the p-dialkoxybenzene. An exothermic reaction proceeds readily and external cooling is required to keep the temperature of the reaction mixture within the desired range of between −10° and 40° C. during the contacting of the reactants. On completion of the reaction, the reaction mixture is poured into cold water or over ice and the resulting mixture allowed to stand until hydrolysis is complete. While the hydrolysis is taking place, the reaction mixture separates into an organic and an aqueous phase. Following the hydrolysis, the two phases are separated. The organic layer is saved and the aqueous phase extracted with an organic liquid, preferably the same organic liquid as employed as reaction medium. Following the extraction of the aqueous phase, the extraction liquid is combined with the organic layer obtained above. The combined organic portions are then extracted with aqueous sodium hydroxide to remove any 2-hydroxy - 5 - alkoxyalkanophenone formed during the acylation. Following the extraction with the aqueous base, the organic layer is fractionally distilled to obtain the 2,5-dialkoxyalkanophenone product coresponding to the formula

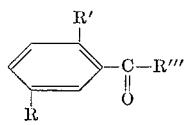

wherein R''' represents alkyl of from 1 to 5 carbon atoms and R is alkoxy. In a representative preparation by such operation, the 2,5-dimethoxyacetophenone product boiled at 107°–110° C. at 1 millimeter of mercury.

The 2,5-dialkoxyalkanophenone thus obtained and hydrazine hydrate are dispersed in a solution formed by adding potassium hydroxide to ethylene glycol. Following the addition of the 2,5-dialkoxyalkanophenone and hydrazine hydrate, the ethylene glycol mixture is heated at the boiling temperature and under reflux for several hours. Thereafter, the reaction mixture is fractionally distilled to remove the low boiling constituents and obtain a liquid residue. The residue is cooled, poured into water, acidified with HCl and extracted with ether. The ether extract is dried and distilled to obtain the 2,5-dialkoxy-alkylbenzene corresponding to the formula:

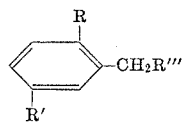

The 2,5-dialkoxyalkylbenzene is then reacted with N-methylformanilide or dimethylformamide and POCl₃ to prepare the 4-alkyl-2,5-dialkoxybenzaldehyde starting material as previously described.

The di(lower alkoxy)alkylbenzenes are prepared in known procedures by reacting a corresponding 2-alkyl-1,4 - dihydroxybenzene or 3-alkyl-1,5-dihydroxybenzene (II) with a lower alkyl iodide or successively with two different lower alkyl iodides or, alternatively, with a lower alkyl iodide and a di(lower alkyl)sulfate to introduce alkoxy moieties for hydroxyl moieties on the benzene nucleus. The reaction is carried out in the presence of a base such as sodium hydroxide or potassium carbonate and conveniently, in a liquid reaction medium such as methanol or ethanol. The reaction proceeds readily at temperatures of from 15° to 45° C. with the production of the desired product and sodium iodide or sodium sulfate of reaction. Where it is desired to introduce different alkoxy groups into the alkyldihydroxybenzene molecule, substantially equimolecular proportions of the alkyldihydroxybenzene, alkyl iodide and potassium carbonate are reacted together under mild conditions to introduce one alkoxy group in place of a hydroxy on the benzene nucleus of the molecule. The reaction mixture is then steam distilled and the distillate made alkaline with an alkali metal hydroxide (NaOH) to convert the alkylalkoxyhydroxybenzene to its alkali metal salt. The alkaline mixture is then extracted with a solvent such as diethyl ether to remove any alkyldi(lower alkoxy)benzene and the aqueous residue made acidic with a mineral acid (HCl) to convert alkali metal salt to the alkylalkoxyhydroxybenzene. The latter product is thereafter reacted with the different lower alkyl iodide or with the corresponding di(lower alkyl)sulfate and with base such as sodium hydroxide under somewhat stronger conditions to introduce the other alkoxy group into the molecule.

Preferred embodiments of the present invention comprise those free phenethylamines characterized by the foregoing formula wherein R is methoxy or ethoxy and such alkoxy substituent occupies the 5 position on the benzene ring, R' is methoxy or ethoxy and R'' is methyl or ethyl, and the pharmacologically-acceptable salts of such free amines.

I claim:
1. The 4 - alkyl - di(lower alkoxy)-α-methylphenethylamine compound corresponding to the formula

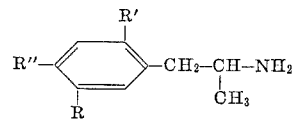

or its pharmacologically-acceptable salt, wherein R and R' represent lower alkoxy, and R'' represents alkyl containing from 1 to 6 carbon atoms, inclusive.

2. The compound claimed in claim 1 which is 2,5-dimethoxy-α,4-dimethylphenethylamine.

3. The compound claimed in claim 1 which is 2-methoxy-5-ethoxy-α,4-dimethylphenethylamine.

4. The compound claimed in claim 1 which is 2,5-dimethoxy-4-ethyl-α-methylphenethylamine.

5. The compound as defined in claim 1 wherein the alkyl is methyl or ethyl and the alkoxy is methoxy or ethoxy occupying the 2 and 5 positions on the benzene ring.

References Cited

Burger et al.: "Jour. Amer. Chem. Soc.," vol. 78, pages 4419–22 (1956).

ROBERT V. HINES, Primary Examiner

U.S. Cl. X.R.

260—239.1, 253, 258, 442, 490, 501.1, 501.11, 592, 599, 612, 621, 689; 424—245, 253, 254, 271, 297, 298, 330